United States Patent [19]

Hubbard et al.

[11] 4,316,197
[45] Feb. 16, 1982

[54] EASILY REMOVABLE INSTRUMENT PEN TIP

[75] Inventors: James R. Hubbard, Moorestown; William A. Tallerico, Willingboro, both of N.J.

[73] Assignee: Graphic Controls Corporation, Cherry Hill, N.J.

[21] Appl. No.: 67,813

[22] Filed: Aug. 20, 1979

Related U.S. Application Data

[63] Continuation of Ser. No. 886,722, Mar. 15, 1978, abandoned.

[51] Int. Cl.³ .......................................... G01D 15/16
[52] U.S. Cl. ............................................... 346/140 R
[58] Field of Search ...................... 346/140 R, 140 A

[56] References Cited

U.S. PATENT DOCUMENTS

| | | | |
|---|---|---|---|
| 2,176,777 | 10/1939 | Tate | 346/140 R |
| 2,727,802 | 12/1955 | Bowditch | 346/140 R |
| 2,829,026 | 4/1958 | Pignone | 346/140 R |
| 2,995,623 | 8/1961 | Scheuzger | 346/140 R X |
| 3,096,742 | 7/1963 | Gill | 346/140 R X |
| 3,452,359 | 6/1969 | Lane | 346/140 R |
| 3,778,843 | 12/1973 | Tullos | 346/140 R |
| 4,017,871 | 4/1977 | Hubbard | 346/140 R |
| 4,100,549 | 7/1978 | Hubbard | 346/140 A |

Primary Examiner—Joseph W. Hartary
Attorney, Agent, or Firm—Paul F. Prestia

[57] ABSTRACT

Easily removable instrument pen tip comprised of a body formed of resilient plastic with an ink passageway adapted to receive and sealingly engage an ink supply tube associated with a pen arm, the other end of which is adapted to receive and sealingly engage an elongated nib element, such as a stylus or fibrous nib. The pen tip body is a flat shaped member in which the passageway lies. The body may converge toward the ink passageway to serve as a visually indicating pointer. The body may also include locators or positioning ribs and reinforcing ribs. Preferably, the body and passageway include bent sections and the nib element and passageway are adapted for engagement only in the bent section passageway.

12 Claims, 6 Drawing Figures

EASILY REMOVABLE INSTRUMENT PEN TIP

This is a continuation of application Ser. No. 886,722, filed Mar. 15, 1978 now abandoned.

This invention pertains to easily removable instrument pen tips and particularly to such tips which are inexpensive to manufacture, convenient to use and adaptable also to serve as a visually indicating pointer.

In many recording instruments, a pen tip is used which receives ink from a remote ink supply, i.e., an ink supply which is not integral or part of the pen tip. Because such pen tips wear, become clogged or otherwise become unuseable, they should be easily removable to facilitate their regular servicing or replacement. If the pen tip is of sufficiently low cost, it may be most economical to replace the tip rather than to try to service it and such tips are therefore often designed for regular replacement. These tips are sometimes referred to as "disposable". Other tips not intended for regular replacement must frequently be removed, serviced and remounted, although if the price is low enough, even these tips may be replaced when servicing is inconvenient.

It is highly desirable, therefore, to develop easily removable pen tips which are more easily manufactured, and therefore lower in cost, than those heretofore available. It is also highly desirable that the pen tip be clearly visually observable so that it may serve as an indicating pointer, as well as a recording pen.

It is the general objective of the present invention to provide such a disposable instrument pen tip and a simple, easily manufactured body for such a pen tip.

By way of background, U.S. Pat. Nos. 2,727,802 and 3,278,942 are of interest. Both show instrument pen tips adapted to be connected with an ink supply tube and to include or be associated with a flat member serving as a visually indicating element. The -942 patent includes a central ink passageway on the underside thereof, closed by tape 68. Positioning locator 46, a central rib serving partially as an indicator 80, bent portion 50 converging toward central rib 80 and an ink passageway proximate thereto correspond to similar features in certain embodiments of the present invention. The ink passageway and its method of manufacture in the present invention is, however, considerably different than that shown in the -942 patent.

The -802 patent utilizes a bent tube 31 to serve as the pen tip in association with a pen support 30 which securely positions pen tip 31 and by its bent and converging front configuration also serves as an indicating pointer. As contrasted with the detachable pen tip in the -802 patent, the present invention is of simpler, more economical and more easily manufacturable design. The distinctive advantages of the present invention, as compared to the design of the -802 patent, reside primarily in the absence of a pen support, the function of which is inherently provided by the body design in the pen tip of the present invention.

Another significant pen tip design known to applicants prior to the present invention is one in which the exterior configuration is similar to that shown in FIG. 1, below, but differing in that the stylus tip includes a bent portion and thus extends through the ink passageway in the bent portion of the pen body and turns the corner such that it then extends also at least part way into the passageway in the main flat shaped body portion of the pen tip in that design. Such a bent stylus tube, in that design, is insert molded into the pen tip. In contrast, the present invention provides more ready adaptability to different pen designs and much simpler manufacturing operation, leading to inherently lower cost.

Other U.S. Pat. Nos. which have been considered relative to the patentability of the present invention, but which are not considered sufficiently relevant to merit separate discussion, are:

Re25,692—Brown;
1,405,409—Hall;
2,876,740—Melas;
2,950,164—Albright;
3,452,359—Lane;
3,482,257—Bowditch et al;
3,611,430—Watchorn et al;
3,771,166—Tullos.

Notwithstanding the prior art, there remains a need for a simpler and lower cost disposable instrument pen tip which is easily manufactured and replaced, reliable in operation, adapted for ready and fixed positioning in an instrument pen arm and which also is adapted to serve as an easily observable visually indicating pointer.

The present invention has been developed to satisfy that need.

Briefly, this invention comprises an easily removable and readily manufacturable instrument pen tip having a body made of resilient plastic with a flat shaped body portion having an ink passageway passing through that portion, the two ends of the passageway being adapted to sealingly receive and engage an ink supply tube and a writing nib element. Preferably locators, such as protuberances or ribs are included on the exterior of the pen tip body to facilitate secure positioning thereof. Preferably also, the body includes a bent portion for writing on a surface essentially parallel to the pen arm and ink supply tube to which the pen tip is adapted to be secured. The bent pen body, including particularly the bent portion, converges toward the central passageway to serve also as an easily observable visually indicating pointer.

For a better understanding of this invention, reference may be made to the detailed description of certain embodiments, including the preferred embodiment, which follows, together with the appended claims and the attached drawings, in which:

Figure 1:
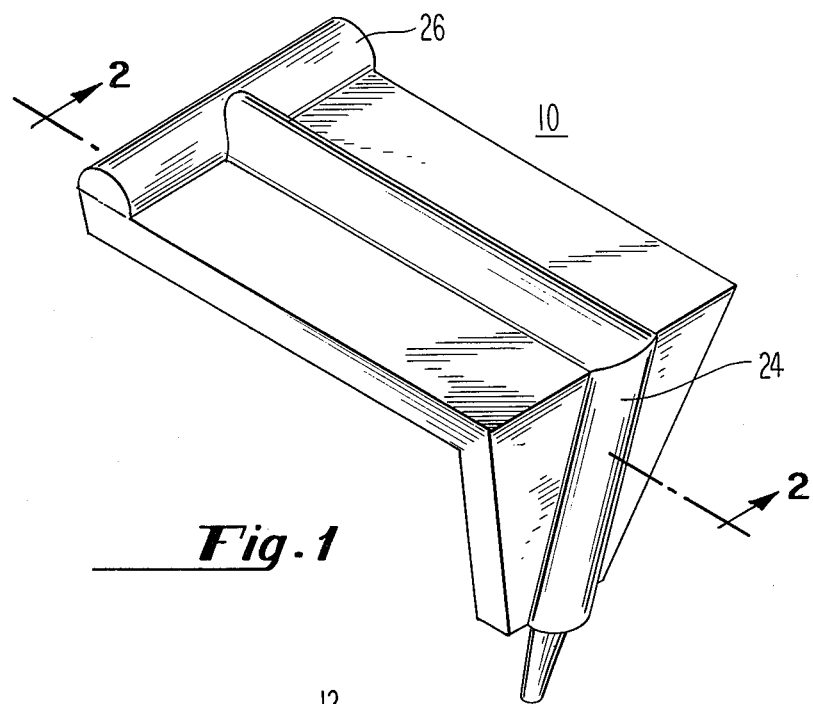
FIG. 1 is a perspective view of the preferred embodiment of the instrument pen tip of the present invention.
Figure 2:
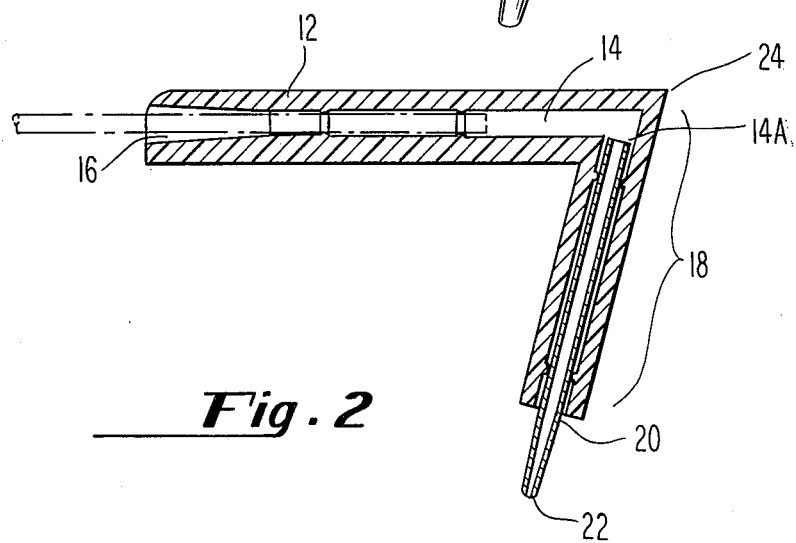
FIG. 2 is a sectional view, in the plane 2—2 of the pen tip shown in FIG. 1.

Turning more specifically to FIGS. 1 and 2, there is shown in perspective view, an easily removable instrument pen tip 10 comprising a body formed of resilient plastic, such as polypropylene or polyethylene, with a passageway 14 therethrough. As seen also in FIG. 2, passageway 14 includes one end 16 which is adapted to receive and sealingly engage an ink supply tube associated with a pen arm, not shown. In this embodiment of the invention, body 12 includes a bent portion 18 through which a portion 14A of passageway 14 also passes. In passageway portion 14A, passageway 14 is adapted to receive and sealingly engage an elongated nib element comprising, in this embodiment of the invention, a stainless steel stylus tube 20 with a writing tip 22.

Both the main section of body 12 and the bent section 18 of body 12 are generally flat shaped portions, bent portion 18 converging inwardly toward passageway 14A, which together with longitudinal rib 24 facilitates the functioning of pen tip 10 also has a visual indicator for direct visual observation of the variable monitored by the recording instrument in which pen tip 10 is used. Passageway 14, at least in its upper portion, is coplanar, i.e., its axis is in roughly the same plane, with the upper body segment of body 12. The exterior surface of body 12 also includes a locator 26 to ensure the secure positioning of pen tip 10 on a pen arm to which it is adapted to be mounted.

It should be noted that prior to the present invention, others had designed and manufactured disposable instrument pen tips differing from that shown in FIGS. 1 and 2 only by the provision of an ink tube or stainless steel stylus which projected up through passageway segment 14A and bent inwardly and partially engaged the main segment of passageway 14 on the upper segment of the pen tip body. The distinctive improvement provided by the present invention is that this prior art design could be manufactured, for practical purposes, only by insert molding. This prior art design is therefore inherently more difficult and therefore more expensive to manufacture. By contrast, the present invention may be injection molded using core pens which mate at the intersection of the two segments of passageway 14 with a mitered corner. Such mitered corner intersecting core rods are pressed together, in the course of the injection process, by molding body 12 with the injection point near the outer surface of the intersection of the bent portion and the main portion of body 12, thus the injection pressure forces the intersecting core pens together and prevents the occurrence of flash at their intersecting points, which would interfere with ink flow through passageway 14. Such an injection forming technique to prevent the formation of flash in intersecting passageways has previously been used commercially to produce other instrument marker pens, but such a technique has never been used and no known intersecting passageways have thus been produced in instrument pen tips of the type to which the present invention pertains, to applicant's knowledge.

Figure 3:
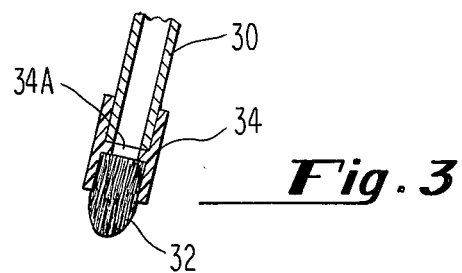
FIG. 3 is an enlarged sectional view of a modified nib end element for use in a pen tip of the type otherwise shown in FIGS. 1 and 2.

Turning now to FIG. 3, there is shown an enlargement of the tip portion of a nib element in a modified embodiment of the invention otherwise shown in FIGS. 1 and 2. More specifically, in this embodiment of the invention, stainless steel stylus 20 is replaced by an ink tube 30, the terminus of which abuts a fibrous writing tip 32, held in engagement therewith by a plastic sleeve 34 having a shoulder seat 34A to limit the inward travel of tip 32.

Figure 4:
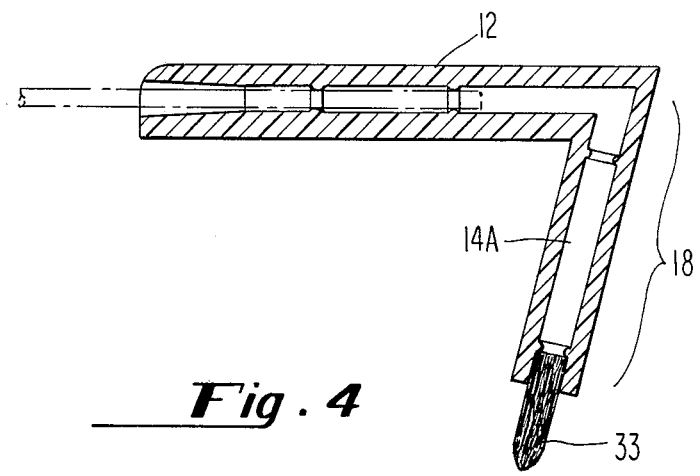
FIG. 4 is another longitudinal cross sectional view of a pen tip similar to that shown in FIGS. 1 and 2, differing, however, in the use of a different nib element.

Still another modification of the pen tip shown in FIGS. 1 and 2 is that seen in FIG. 4, in which a fibrous or sintered elongated nib element 33 referred to generically as a porous nib element, is sealingly engaged in the passageway segment 14A of the bent portion 18 of body 12. Here again, it should be noted that the use of such elongated porous nib elements would not have been possible with the insert molded but otherwise similar bodies of the previously designed pen tips referred to above.

Figure 5:
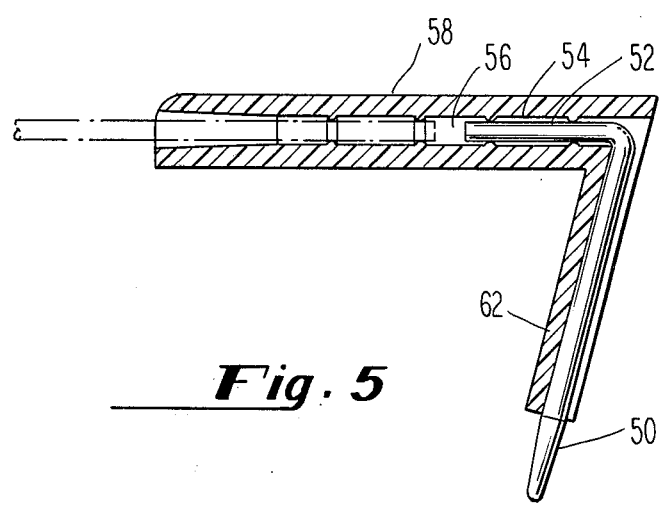
FIG. 5 is a longitudinal cross sectional view of another embodiment of the present invention.
Figure 6:
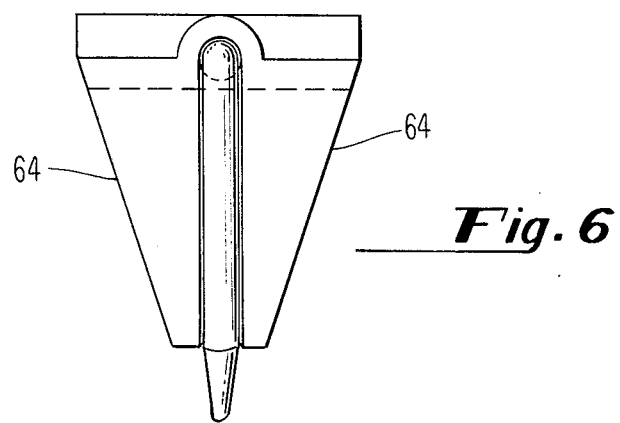
FIG. 6 is a front view of the pen tip shown in FIG. 5.

Turning now to FIGS. 5 and 6, there is seen a distinctly different embodiment of the present invention, in which the stylus or ink tube 50 includes a bent portion 52 which is friction fit and sealingly engaged in an end 54 of passageway 56 in pen tip body 58. The other end 60 of passageway 56 is also adapted to sealingly engage an ink supply tube associated with a pen arm, not shown. In this embodiment of the invention, which also may be injection molded as with the previous embodiments, body 58 includes a bent portion 62 only at the inwardly turned side of tube 50, bent portion 62 also including inwardly converging sidewalls 64 to provide a more readily observable visual indicating function. The top of body 58 extends over the downwardly extending segment of ink tube or stylus 50 so as to provide downward support therefor.

While this invention has been described with respect to particular embodiments, it is not limited thereto. Rather, numerous other forms of the invention may be devised by those skilled in the art without departing from the invention's true spirit and scope. The appended claims are intended to be construed to encompass all such embodiments, whether or not specifically disclosed herein, so long as said embodiments are within the true spirit and scope of the invention as disclosed and claimed.

Having described my invention, we claim, and desire to secure by Letters Patent, the following:

1. One piece removable and replaceable instrument pen tip body formed of resilient plastic, said body having an ink transmitting passageway therethrough, one end of which is adapted to receive and sealingly engage an ink supply tube associated with a pen arm and a remote ink supply and the other end of which is adapted to receive and sealingly engage a straight section of an elongated nib element in alignment therewith, said body having a relatively flat shaped portion, said passageway being open from said tube to said nib element, at least a portion of said passageway having an axis lying in the plane of said flat shaped portion, said body also having at least one locator on its outer surface to ensure positive positioning of said body on mounting means therefor.

2. Disposable instrument pen tip body, as recited in claim 1, wherein said passageway is straight and is adapted to receive a bent elongated nib element including a straight section in alignment with said passageway and a bent section not in alignment with said passageway and said flat shaped body portion is adapted to overlay and provide support to said bent section of said nib element not in alignment with said passageway.

3. Disposable instrument pen tip body, as recited in claim 2, wherein a second flat shaped portion of said body is bent to conform to the inner angle formed by said bent nib element which said body is adapted to receive.

4. Disposable instrument pen tip body, as recited in claim 3, wherein said second flat shaped portion converges inwardly toward said passageway.

5. Disposable instrument pen tip body, as recited in claim 4, in combination with a nib element sealingly engaged in the nib end of said passageway, said nib element comprising a tubular writing stylus having a bent portion, one end of which comprises a writing tip.

6. Disposable instrument pen tip body, as recited in claim 1 further including a second flat body portion forming an angle with said first flat body portion, said passageway extending through and being co-planar with said second flat body portion and said passageway also forming an angle between the sections of said passageway in said first and second body portions, said nib element receiving end of said passageway being located in said second body portion.

7. Disposable instrument pen tip body, as recited in claim 1, wherein said second body portion converges toward said passageway.

8. Disposable instrument pen tip body, as recited in claim 7, further including a rib on the outer surface thereof, said rib paralleling said passageway in close proximity thereto.

9. Disposable instrument pen tip body, as recited in claim 8, in combination with a nib element consisting of a stylus tube with writing tip sealingly engaged with said passageway only in that portion of said passageway extending through said second body portion.

10. Disposable instrument pen tip body, as recited in claim 8, in combination with a nib element consisting of an ink tube with a fibrous writing tip fixed on the end thereof, said tube being sealingly engaged with said passageway only in that portion of said passageway extending through said second body portion.

11. Disposable instrument pen tip body, as recited in claim 8, in combination with a nib element consisting of an elongated porous capillary nib with a writing tip at the end thereof, said nib being sealingly engaged with said passageway only in that portion of said passageway extending through said second body portion.

12. Disposable instrument pen tip body, as recited in claim 8, in combination with a nib element consisting of an elongated fibrous capillary nib with a writing tip at the end thereof, said nib being sealingly engaged with said passageway only in that portion of said passageway extending through said second body portion.

* * * * *